Aug. 29, 1961  S. UNTERMYER  2,998,369
PLATE ASSEMBLY
Filed Sept. 3, 1957
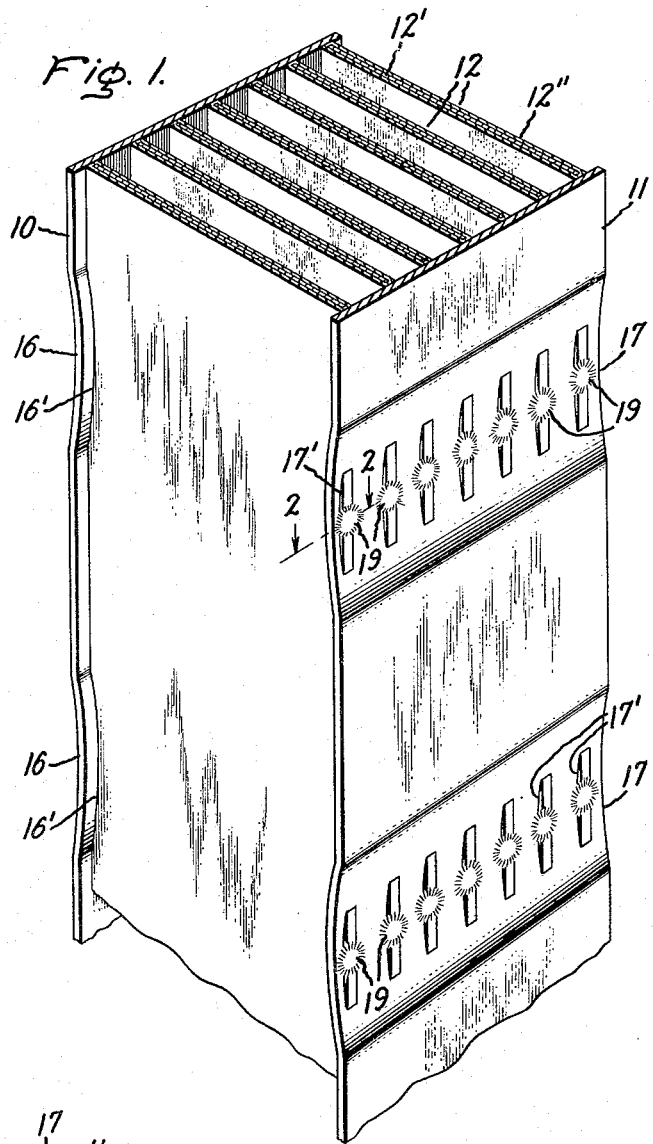
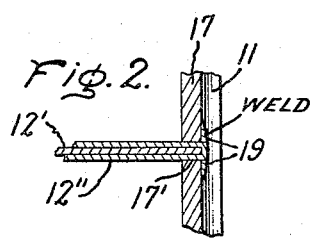
Inventor:
Samuel Untermyer,
by Leonard B. Mackey
His Attorney.

United States Patent Office 2,998,369
Patented Aug. 29, 1961

2,998,369
PLATE ASSEMBLY
Samuel Untermyer, Atherton, Calif., assignor to General Electric Company, a corporation of New York
Filed Sept. 3, 1957, Ser. No. 681,774
5 Claims. (Cl. 204—193.2)

This invention relates to plate assemblies. While the plate assemblies of this invention are suited for many applications, they are ideally suited for plate type nuclear fuel elements and are particularly described in this connection.

A form of nuclear reactor consists of fissionable material oriented to provide a nuclear chain reacting core assembly. Fissionable material is often contained in active plates consisting of a sandwich of an alloy of fissionable material surrounded by cladding to prevent escape of fission products and minimize the corrosive effects of reactor coolants on the fissionable material. Active plates are customarily fabricated into nuclear fuel elements consisting of a plurality of plates which must be maintained in accurately spaced relationship to each other under the severe thermal and nuclear environment obtaining in an operating nuclear reactor.

Among the several forms of plate type nuclear fuel elements is the form wherein edge members are secured to each active plate. The edge members are subsequently welded or brazed together to form side members having a plurality of plates extending therebetween. This form of fuel element is relatively wasteful of material and, in view of the numerous operations involved in fabrication, is expensive.

Another form of fuel element consists of active plates extending between and into continuous grooves machined or otherwise formed in side members. The plates are secured to the side members by welding or brazing along the grooves.

Among the inherent features of these fuel elements are the relative difficulty inspecting the quality of the welding or brazing and the extreme care which must be taken to obtain a good bond between the active plates and side members without overheating and damaging the active plates. Also, the relatively heavy side members capture neutrons which are needed to maintain a nuclear chain reaction, thereby resulting in poor neutron economy.

Accordingly, a principal object of this invention is to provide improved easily and economically fabricated plate type assemblies which, when adapted to plate type nuclear fuel elements, result in improved neutron economy.

In accordance with an aspect of this invention, there is provided a plate assembly comprising at least one side member having at least one indentation therein. The indentation is slotted to receive a plate member which is inserted in the slot and secured to the side member at the indentation.

Other objects and important aspects of this invention will become apparent from the following specification and claims when taken with the figures of the drawing wherein:

FIGURE 1 illustrates a perspective view of a portion of a plate type nuclear fuel element incorporating this invention, and FIGURE 2 illustrates a section through a portion of the fuel element illustrated in FIGURE 1.

In FIGURES 1 and 2, there is illustrated a nuclear fuel element, in accordance with this invention, consisting of side members 10 and 11 and active plate members 12 secured therebetween. The plate members consist of an inner active portion 12', including fissionable material, surrounded by neutron permeable cladding 12". Side members 10 and 11 are provided with longitudinally spaced indentations 16 and 17, respectively, including longitudinally extending slots 16' and 17'. These indentations and slots may be formed by any conventional shop practice and, for example, may be pressed from the side members and slotted by means of a punch press. The slots are aligned to receive and provide intermittent guides for the plates. Plates 12 contact the inner surfaces of side members 10 and 11 and extend through slots 16' and 17' in indentations 16 and 17. The plates are secured to the side members at each indentation by any satisfactory means, in this example, by spot welds 19.

In a typical plate type nuclear fuel element incorporating this invention, the side members consist of 3 inch by 74 inch, 32 mil stainless steel plates and are indented and slotted by a punch press. Six fuel plates consisting of an alloy of uranium and aluminum, including fissionable material, aluminum clad, to form active 26 mil plates, 3 inches by 74 inches, are inserted in the slots. Each plate is spot welded to the side member at each indentation to complete an approximately 3 inch square by 74 inch fuel element.

It is readily apparent that the plate assembly of this invention is easily and economically fabricated and makes economical use of structural material. The slotted indentations provide all necessary support for the plates and maintain the active plates in the desired spaced relation. This is a particularly advantageous feature for plate type nuclear fuel elements since the reduced amount of inactive structural material results in a lower required fuel inventory and improved neutron economy; i.e., fewer neutrons are wasted in inactive material.

Slotting and forming can be performed with a punch press and the machine work necessary to provide, for example, continuous grooves in a side member is not required. Also, the use of spot welding to bond the plates to the side members minimizes the likelihood of overheating the plates and results in a bond that can be inspected conveniently.

While this invention has been described, by way of example, in connection with a specific embodiment of a nuclear fuel element, it will be readily apparent that plate type assemblies incorporating the practice of this invention may be used for many and varied purposes. Accordingly, it is intended in the appended claims to cover all modifications and variations coming within the true scope and spirit of this invention.

What is claimed is:

1. A plate type nuclear fuel assembly comprising two substantially parallelly disposed side members having a plurality of longitudinally spaced indentations, each indentation including a plurality of slots therein, said slots in successive indentations being aligned to provide intermittent guides for plates, and a plurality of spaced nuclear fuel plates extending between said side members and through said slots and being secured at their edges to the external surfaces of said side members at the points of intersection with said indentations.

2. A plate type nuclear fuel assembly comprising two substantially parallelly disposed side members having a plurality of longitudinally spaced indentations pressed therefrom and extending inwardly, each indentation including a plurality of slots therein, said slots in each indentation being longitudinally aligned with corresponding slots in successive indentations to provide intermittent guides for plates, and a plurality of spaced nuclear fuel plates extending between said side members and through said slots and being secured at their edges to the external surfaces of said side members at the points of intersection with said indentations.

3. A nuclear plate type fuel assembly comprising two substantially parallelly disposed side plate members having a plurality of transverse longitudinally spaced indentations pressed therefrom and extending inwardly, each indentation including a plurality of slots therein, said slots in each indentation being longitudinally aligned with corresponding slots in successive indentations to provide intermittent guides for plates, a plurality of spaced substantially parallel plates including fissionable material extending between said side members and through said slots and being secured at their edges to the external surfaces of said side members at the point of intersection between said edges and said slots.

4. A plate-type nuclear fuel assembly which comprises a pair of elongated side plates disposed parallel to and spaced apart from one another, said side plates being provided with a plurality of transverse parallel indentations spaced apart from one another along the length of said plates, said indentations each having a plurality of parallel slots which are aligned with slots in the other indentations, and a plurality of fuel plates containing fissionable material disposed parallel to one another and substantially perpendicular to and between said side plates, the respective edges of said fuel plates intersecting with the aligned and indented slots of said side plates and being attached thereto only at the points of intersection.

5. A nuclear fuel assembly according to claim 4 wherein said fuel plates are attached by means of a spot weld applied on the outside of said side plates at the points of intersection thereof with said fuel plate edges.

References Cited in the file of this patent

UNITED STATES PATENTS 2,574,572    Leven ---------------- Nov. 13, 1951

OTHER REFERENCES

TID-7506 (pt. 1), p. 70, available from ANL, P.O. Box 299, Lamont, Ill., copy in Lib.

Iron & Steel Engr., November 1956, article by Nussbaum, pp. 2-11, copy in Library, 204/154.34.